Jan. 29, 1957

C. O. LASSY 2,779,219

SLIDE FIXTURE

Filed Jan. 19, 1954

Carl O. Lassy
INVENTOR.

Jan. 29, 1957 C. O. LASSY 2,779,219
SLIDE FIXTURE
Filed Jan. 19, 1954 5 Sheets-Sheet 2
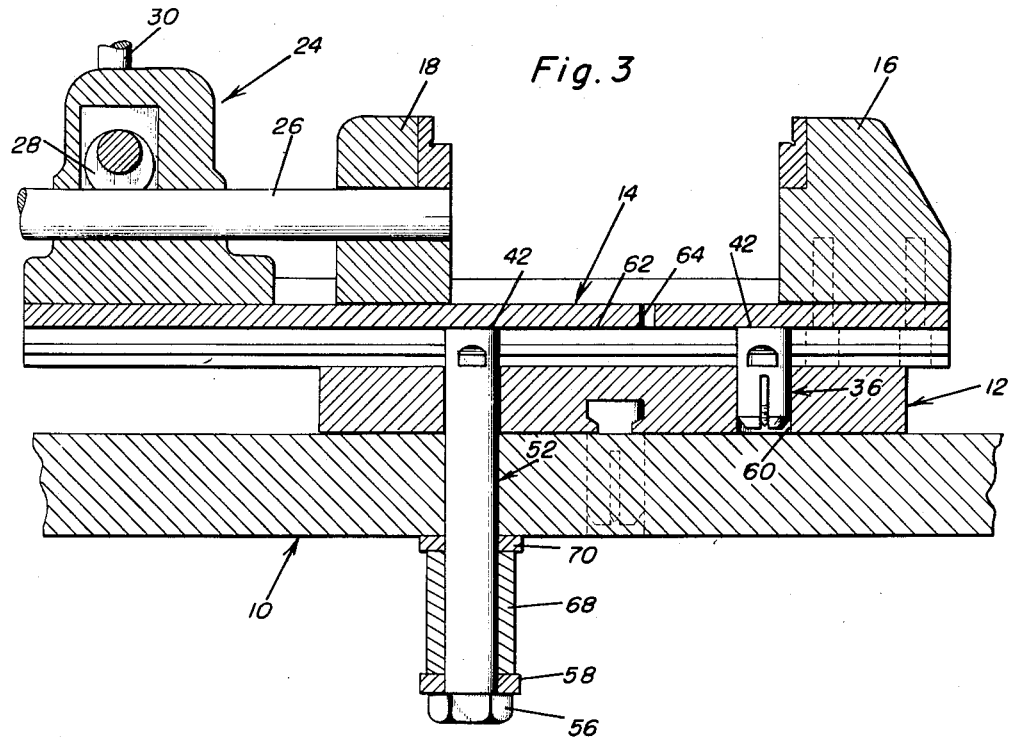
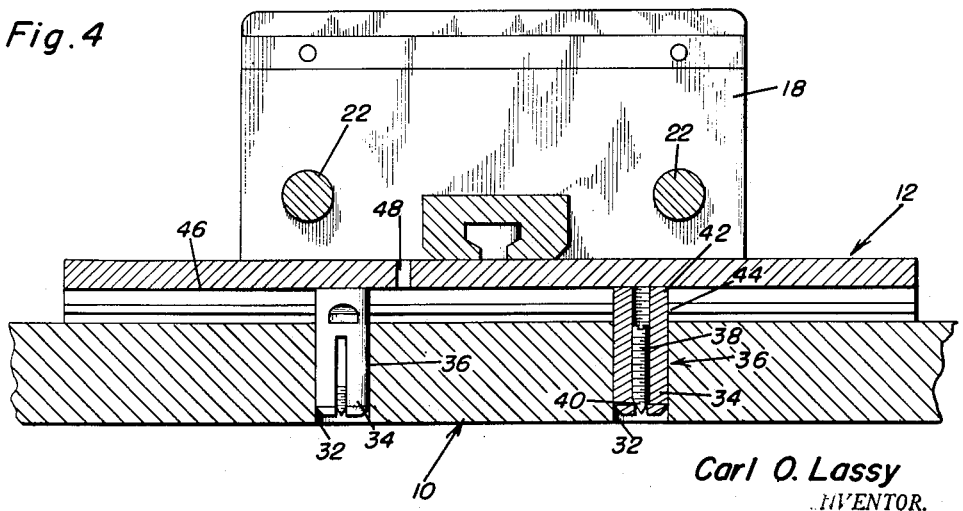
Carl O. Lassy
INVENTOR.

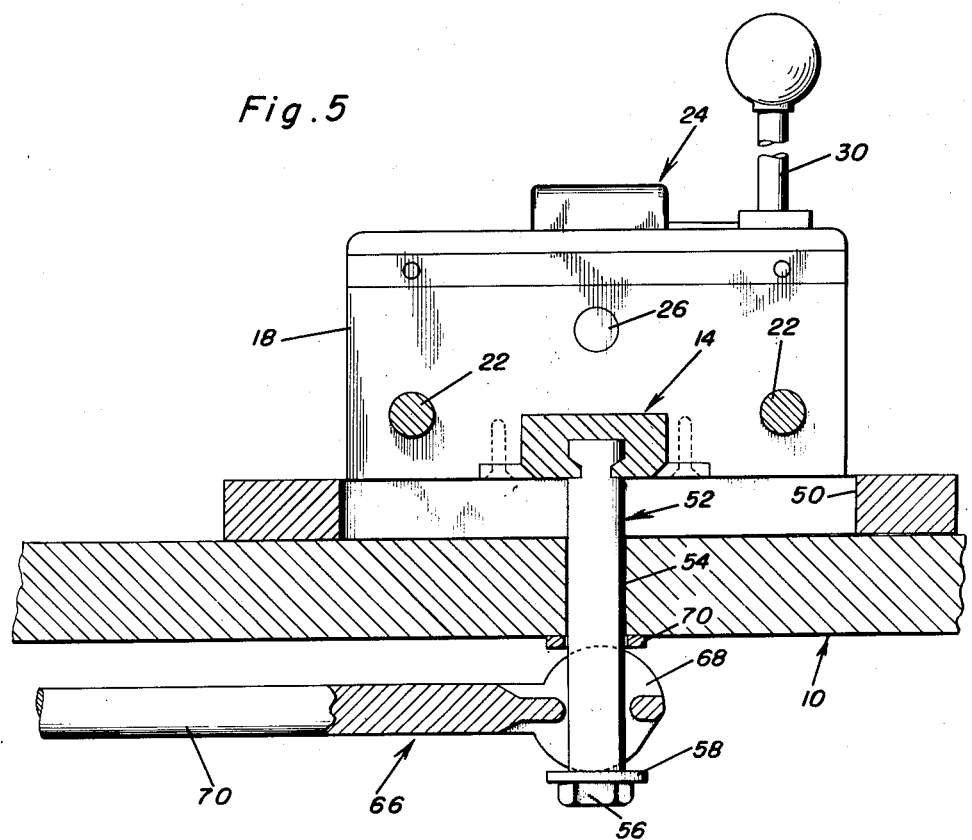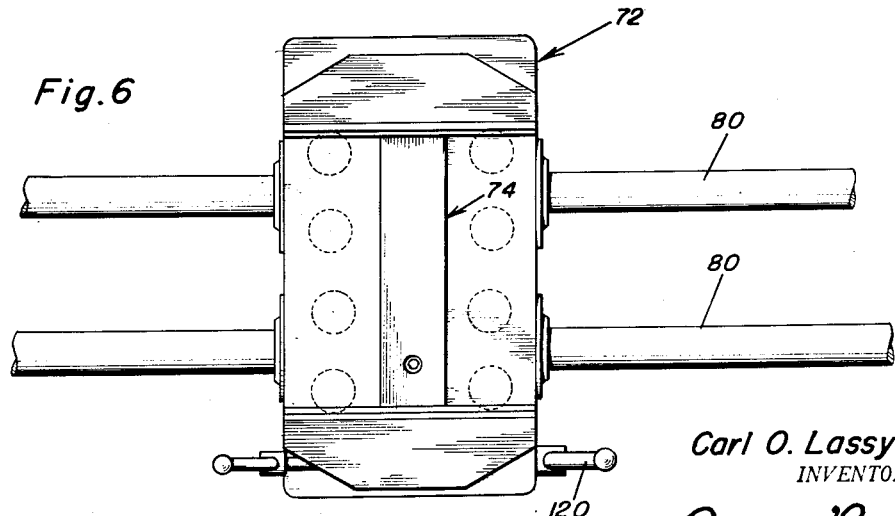
Carl O. Lassy
INVENTOR.

Jan. 29, 1957     C. O. LASSY     2,779,219
SLIDE FIXTURE
Filed Jan. 19, 1954     5 Sheets-Sheet 4
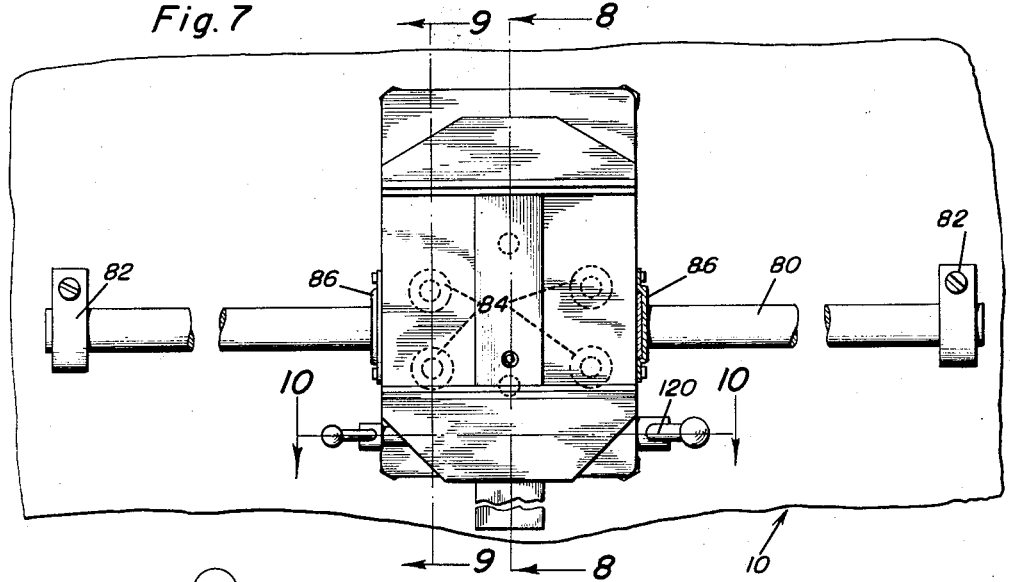
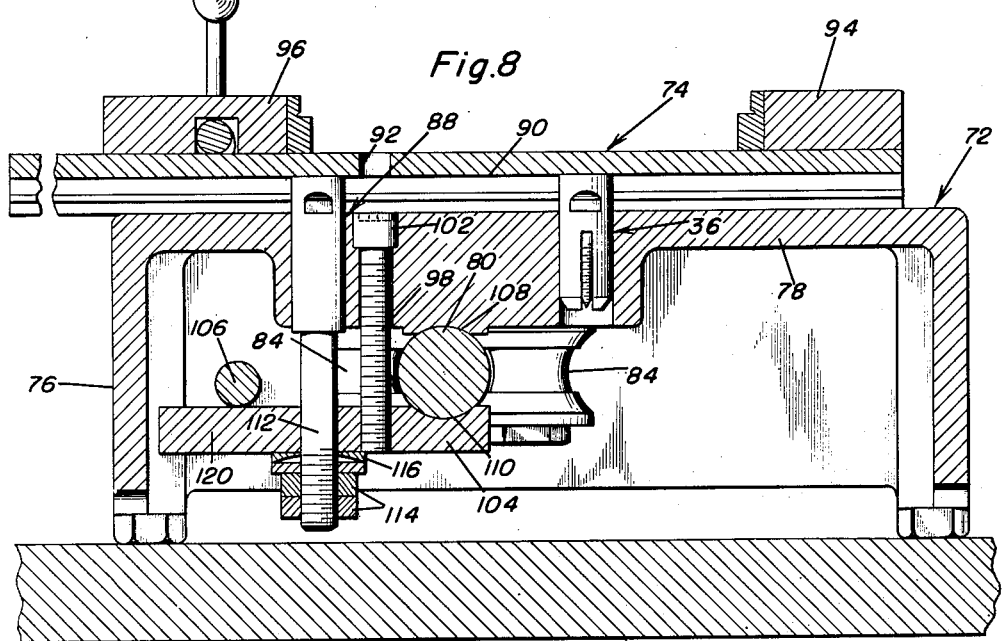
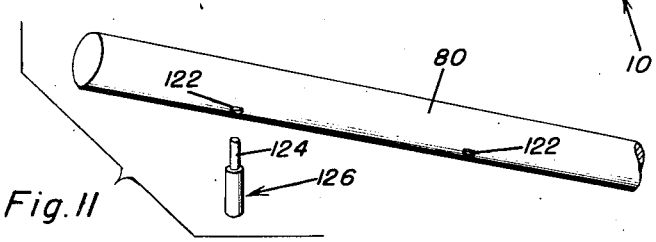
Carl O. Lassy
INVENTOR.

Jan. 29, 1957　　　　C. O. LASSY　　　　2,779,219
SLIDE FIXTURE

Filed Jan. 19, 1954　　　　　　　　　　5 Sheets-Sheet 5

Carl O. Lassy
INVENTOR.

BY *Clarence A. O'Brien*
*and Harvey B. Jackson*
Attorneys

United States Patent Office 2,779,219
Patented Jan. 29, 1957

2,779,219

SLIDE FIXTURE

Carl O. Lassy, Plainville, Conn.

Application January 19, 1954, Serial No. 404,913

4 Claims. (Cl. 77—63)

This invention relates generally to machine tools, and pertains more particularly to improved carriage assemblies for quickly and accurately positioning the work in relation to the cutting tool in a desired position.

The primary object of my invention is to provide a mechanism that has a vise incorporated and which may for some applications have a flat platten for mounting jigs in place of the vise, this vise or platten is incorporated into carriage assemblies and provides a free sliding movement in directions at right angles to each other, yet at the same time, the vise or platten cannot whirl, turn or be lifted off the machine table through action of cutting tool, be it a drill, tap or counterbore.

Another primary object of this invention is to so secure mechanism together and to machine table that while free sliding movement at right angles to each other is obtained, no part of the mechanism can be lifted off the machine table through action of a cutting tool or through inadvertently lifting the mechanism while locking or unlocking the vise while changing work.

The aforementioned is of great value and importance in drilling and tapping operations, because it provides a means for securely holding work from turning due to cutting tool action and prevents work from being lifted off the machine table when the cutting tool is retracted, preventing chips from getting between the machine table and mechanism.

Another primary object of this invention is to provide a means for the mechanism to roll freely on two bars that are attached to both ends of the table, keeping the entire moving mechanism free and clear of the machine table thereby eliminating the problem of chips and preventing the machine table from becoming worn and battered which occurs when work or jigs are used directly on the machine table. The aforementioned wear and battering destroys accuracy.

Another primary object is to provide a mechanism whereby the operator does not have to put his hand near the cutting tool for the purpose of positioning the work on the machine table in relation to the cutting tool. With my invention, movement is obtained in either direction, with the operator's hand free and clear of the cutting tool at all times.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged vertical section taken substantially along the plane of section line 3—3 in Figure 1;

Figure 4 is an enlarged transverse vertical section taken substantially along the plane of section line 4—4 in Figure 1;

Figure 5 is another enlarged transverse vertical section taken substantially along the plane of section line 5—5 in Figure 1;

Figure 6 is a plan view of a modified form of the invention;

Figure 7 is a plan view of a still further modified form of the invention;

Figure 8 is an enlarged section taken substantially along the plane of section line 8—8 in Figure 7;

Figure 11 is a perspective view of a modified form of mounting bar assembly.

Figure 1:
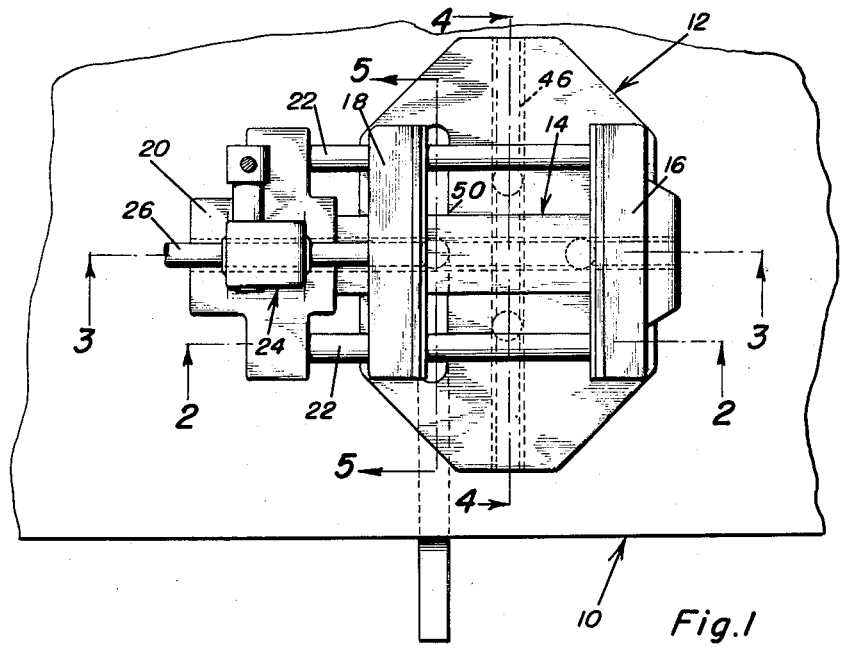
Figure 1 is a plan view of one form of the invention.
Figure 2:
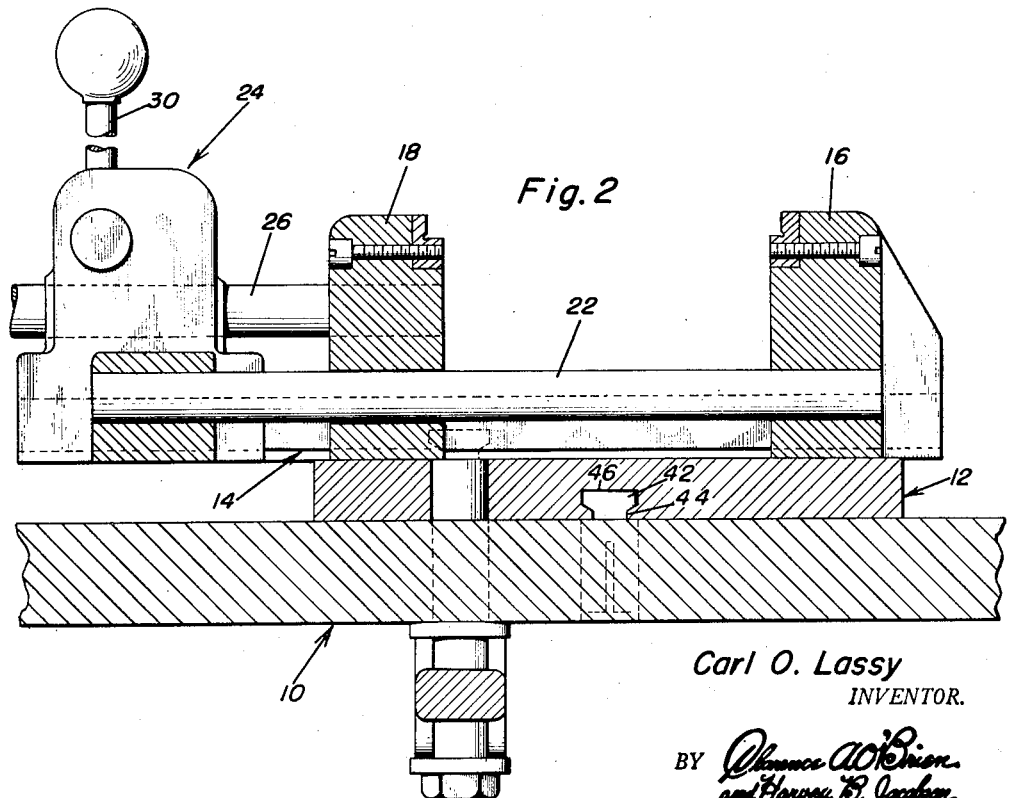
Figure 2 is an enlarged vertical section taken substantially along the plane of section line 2—2 in Figure 1.
Figure 9:
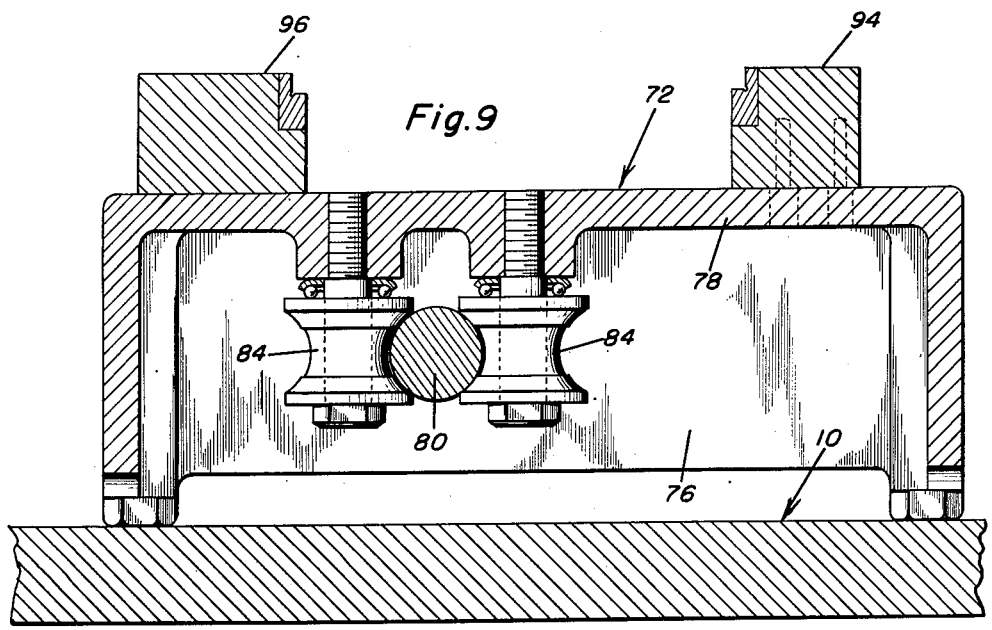
Figure 9 is another enlarged vertical section taken substantially along the plane of section line 9—9 in Figure 7.
Figure 10:
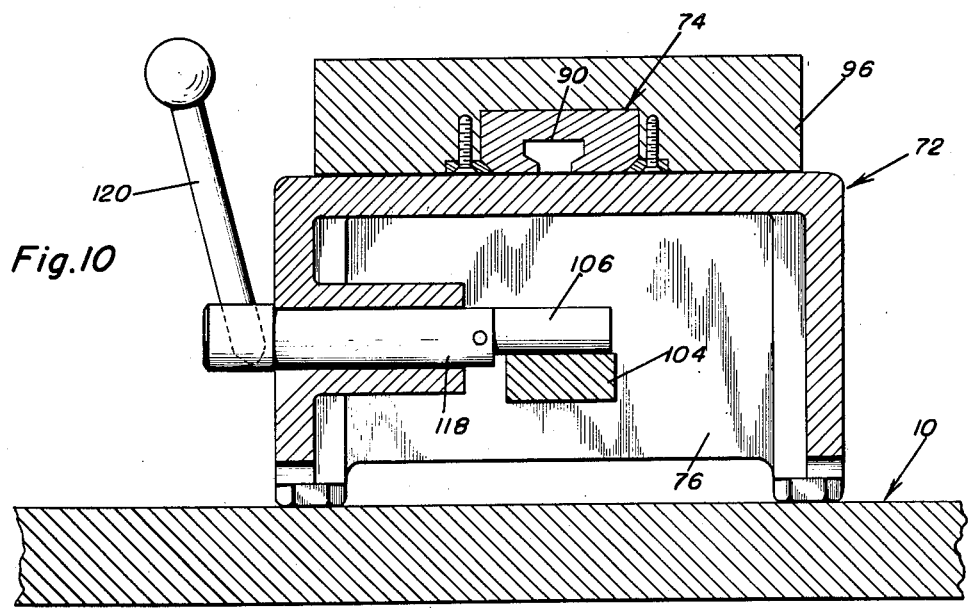
Figure 10 is still another vertical section taken substantially along the plane of section line 10—10 in Figure 7.

Referring now more particularly to Figures 1–5, reference numeral 10 indicates a machine base or table generally and for the purpose of clarity, the invention will be seen to consist essentially of a first carriage member indicated generally by the reference character 12 which is slidably mounted on the base 10 for movement linearly therealong and a second carriage indicated generally by the reference character 14 which is slidably mounted on the first carriage for movement linearly therealong but in a direction disposed transversely of the movement of the first carriage.

In the drawings, it will be noted that the second carriage 14 is provided with a fixed vise jaw member 16 and a movable jaw member 18 slidable longitudinally therealong toward and away from the fixed jaw member and is also provided with a vise head member 20 at the end opposite the fixed jaw member which is provided with guide rail members 22 extending therefrom through the movable jaw 18 as well as the fixed jaw 16 and with a clamping member, indicated generally by the reference character 24, through which a rail 26 fixed at one end to the movable jaw 18 is projected, the purpose of the clamping assembly being to fix the movable vise jaw in a desired position. The clamping assembly may take the form of a cam lock mechanism 28 operable by the handle member 30, as shown most clearly in Figure 3, although the details of such form no part of this invention. Moreover, it is to be noted that the carriage assemblies hereinafter more particularly described may be utilized for mounting mechanisms other than vises.

For the purpose of slidably mounting the first carriage assembly 12 to the base 10, it will be noted that the base is provided with a pair of spaced apertures 32 into which the split lower ends 34 of the pin members 36 are projected. The pin members are provided with longitudinal bores which are tapered sharply at the lower extremity of the members and which are internally threaded to receive the locking screw members 38 in the manner shown most clearly in Figure 4. The lower end of the locking screws are tapered to a point as indicated by the reference character 40 and as the points of the screws are engaged against the tapered or restricted portion of the threaded bore, the split lower ends of the pin members are forced to spread into clamping engagement with the base 10 and are thus rigidly affixed thereto.

The upper ends of the pin members 36 are provided with head portions 42 having diametrically opposed slots 44 to conform in cross-section with and to be snugly received in an elongated substantially T-shaped groove formed in the undersurface of the carriage 12. When the carriage 12 is assembled on the machine base 10, the pin members 36 are initially left in unlocked position and the groove 46 in the carriage engaged therewith. The carriage 12 is then pressed firmly against the upper surface of the machine table with sufficient force as to firmly engage the two members while yet readily permitting sliding movement between the two, and the carriage 12 is then moved to such a position that the aperture 48 communicating with the groove 46 is disposed over one of the pin members such that a tool may be inserted therethrough for actuating the associated locking screw 38 to rigidly affix the pin member 36 associated therewith to the machine base. The carriage is then slid along the base while still maintaining sufficient pressure thereon until the aperture 48 is over the other pin member which may then be affixed to the machine base. In this manner, clearance between the undersurface of the carriage 12 and the upper surface of the machine table or base is reduced to a practical minimum such that chips and other foreign objects may not be interposed therebetween which might otherwise cause rapid wear and disalignment resulting in an inaccurate and generally unsuitable assembly.

As seen most clearly in Figures 1 and 5, the carriage 12 is provided with an elongated slot 50 parallel with the elongated groove 46, this slot permitting a pin member 52 to project through the carriage without impairing the sliding movement thereof. It will also be noted that the pin 52 taken in conjunction with the slot 50 provides a limit stop for sliding movement of the carriage 12. The pin 52 is slidably received in an aperture 54 in the base 10 and extends therebelow, as illustrated most clearly in Figures 2, 3 and 5, and is provided at its lower extremity with an enlarged head 56 and a thrust washer 58. Preferably, the enlarged portion 56 of this pin assembly takes the form of a nut threadedly engaged on the lower extremity of the pin such as to provide limited adjustment as will be presently apparent. A further split pin member 36 is received in an aperture 60 in the carriage 12 and cooperates with the pin member 52, each being provided with a head portion 42 to be received in a substantially T-shaped groove 62 formed in the undersurface of the second carriage assembly 14. This carriage is also provided with an aperture 64 through which a tool may be inserted for locking the pin member 36 as previously described.

A locking member, indicated generally by the reference character 66, is associated with the pin member 52 for imparting slight downward movement of the same which will simultaneously clamp the second carriage 14 to the first carriage 12 and the first carriage to the machine base 10 to lock the entire assembly against sliding movement when the assembly is in the desired position. This is accomplished by means of a cam head 68 surrounding the lower end of the pin member 52 in the manner shown most clearly in Figure 5, the operation being such that as the handle member 70 is depressed, the head 68, acting against the previously mentioned thrust washer 58 and a further washer 71 provided between the cam head and the machine base 10 urges the pin member 52 in a downward direction. The head 56 of the pin 52 may be integral therewith, but is preferably formed as a separate nut member for adjustment longitudinally of the pin to provide proper guiding action of this pin when the cam is in the raised or unlocking position, while readily accomplishing the locking movement when desired.

Referring now more particularly to Figures 7-10, the modified form of the assembly shown therein will be seen to consist essentially of a first carriage assembly 72 and a second carriage assembly 74, each operatively mounted one with the other and with the machine base 10 as to provide the same type of sliding movement previously described. In this instance, the first carriage 72 is recessed in its undersurface so as to provide a peripheral depending wall 76 and a top portion 78. An elongated bar 80 is rigidly affixed by any suitable mechanism 82 at its opposite ends to the machine base 10 and opposed sides of the wall 76 are apertured to receive this bar member such that the first carriage may pass therealong. For the purpose of guiding the carriage on the bar 80, rollers 84, preferably at least four in number, are rotatably mounted on the carriage within the recess thereof in the manner shown most clearly in Figure 8. It is to be noted that dust cap members or seals 86 may be provided on the opposite sides of the wall 76 around the apertures receiving the bar 80 to prevent dust and foreign objects from collecting on the bar 80.

The second carriage 74 is slidably mounted on the first carriage 72 by means of a locking pin member 36 and a combined guide and locking pin member 88, each having head portions received within a substantially T-shaped groove 90 in the undersurface of the second carriage. The second carriage is provided with an aperture 92 identical with the previously described apertures 48 and 64. Fixed and movable jaw members 94 and 96, respectively, may be operatively associated with the second slide 74 or other suitable mechanism may be mounted thereon, as desired.

The fastening bolt 98 is passed freely through an aperture 100 in the top wall 78 of the first carriage 72 and its upper end is headed as at 102 to limit downward movement therein. The lower end of this bolt is threadedly engaged in a lever member 104 whose opposite ends are disposed beneath the bar 80 and a locking eccentric 106, respectively. In this manner, it will be seen that the aperture 92 in the second carriage 74 may be positioned above the head 102 of the locking bolt 98 so that the tool may manipulate the latter to urge the lever 104 into engagement with the bar 80 and the undersurface of the first carriage to rigidly lock the first carriage against movement along the bar. To effect proper frictional engagement between the lever and the first carriage on the one hand and the bar on the other hand, each may be arcuately grooved, as at 108 and 110, respectively. For the purpose of effecting locking of both the first and second carriages against sliding movement, it will be noted that the lower end portion 112 of the combined guide and locking pin 88 extends through the lever 104 and is provided at its threaded lower end with a pair of lock nut members 114, suitable washers 116 being disposed between the nut 114 and the lever 104. As seen most clearly in Figure 10, the locking eccentric 106 is formed at the free end of a shaft 118 journaled in the first carriage 72, the shaft being provided at its outer free end with a handle member 120 so that the shaft 118 may be easily rotated. When the shaft 118, and consequently, the cam eccentric 106 are rotated to positions such that the lever 104 is forced downwardly at its end 120 underlying the eccentric, not only will the lever 104 clamp against the bar 80, but also the combined guide and locking pin 88 will be forced downwardly. This action will effect simultaneous clamping of the second carriage to the first carriage and clamping of the bar member 80 to prevent motion of either of the carriage assemblies.

Referring now more particularly to Figure 6, wherein a further modification of the invention is shown, the assembly illustrated is identical in construction to the assembly shown in Figures 7-10 with the exception that two bar members 80 are provided for mounting the first carriage 72.

In Figure 11, it will be noted that the bar 80 is provided with radial apertures 122 receiving the reduced end portions 124 of the support posts 126. This particular construction is utilized wherein the bar members 80 are of very great length for use on machine tables of correspondingly great length and imparting stability, rigidity and accuracy to the bars 80.

The slide fixture of the invention, which will accommodate either jigs or vises, has a free sliding motion in both directions, crosswise and lengthwise, which combination gives infinite positioning, anywhere within the range of the machine table, only limited by the size of the slide fixture. With this very important feature, the cross motion or the lengthwise motion can be individually or simultaneously locked instantly. This feature is of great advantage, for instance, it may be required to provide a fixed movement in one direction only, as occurs when a series of holes are drilled or tapped in line, or it may be desirable on some operations to position the fixture in many different locations, locking the entire mechanism and preventing all free motion.

From the foregoing, the construction and operation of the device will be readily understood and further description is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a machine tool, a base, a pair of spaced pin members fixed to said base and having head portions projecting above the same, a first carriage, said carriage having an elongated groove therein receiving the head portions of said pin members whereby the carriage is slidably mounted on the base for movement linearly thereof, said carriage also having one elongated slot disposed in parallelism with said groove, a combined guide and locking pin received in said base and projecting through said slot to terminate in a head portion projecting above said carriage, a guide pin fixed to said carriage and having a head portion projecting above the same, said combined guide and locking pin and said guide pin being aligned transversely of said pin members, a second carriage having an elongated groove therein receiving the head portions of said guide pins and said combined guide and locking pin whereby the second carriage is slidably mounted on the first for movement laterally of the direction of movement of the first carriage, and means for selectively urging said combined guide and locking pin downwardly to clamp said second carriage to said first carriage and said first carriage to said base to prevent sliding movement of either.

2. In a machine tool, a base, an elongated bar fixed to said base, a first carriage slidably receiving said bar for linear movement along said base, a guide pin fixed to said first carriage and having a head portion projecting above the same, a combined guide and locking pin received in said first carriage and having a head portion projecting above the same, said guide pin and said combined guide and locking pin being aligned transversely of said bar, a second carriage having an elongated groove therein receiving the head portion of said guide pin and said combined guide and locking pin whereby the second carriage is slidably mounted on the first, means including a lever engageable with said bar for selectively locking said first carriage against sliding movement.

3. In a machine tool, a base, an elongated bar fixed to said base, a first carriage slidably receiving said bar for linear movement along said base, a guide pin fixed to said first carriage and having a head portion projecting above the same, a combined guide and locking pin received in said first carriage and having a head portion projecting above the same, said guide pin and said combined guide and locking pin being aligned transversely of said bar, a second carriage having an elongated groove therein receiving the head portion of said guide pin and said combined guide and locking pin whereby the second carriage is slidably mounted on the first, means including a lever engageable with said bar for selectively locking said first carriage against sliding movement, said means also including mechanism for simultaneously engaging said lever with said bar and urging said combined guide and locking pin downwardly to selectively, simultaneously lock the first and second carriages against sliding movement.

4. In a machine tool, a support, a first carriage, guide means for slidably mounting said first carriage on said support for movement in one direction therealong, pin members received in said first carriage in transverse alignment to the direction of movement of said first carriage on said support, said pin members having upstanding head portions projecting above the first carriage, a second carriage, said second carriage having an elongated groove in its undersurface, said groove having one portion adjacent said undersurface narrower than another portion more remote therefrom, the head portions of said pin members being snugly received in said groove whereby the second carriage is slidably mounted on the first carriage for movement in a direction transverse to that of the first carriage, and means engaging one of said pin members and said support for urging said one pin member downwardly to clamp said second carriage on said first carriage and to simultaneously clamp said first carriage on said support.

References Cited in the file of this patent
UNITED STATES PATENTS

| | | |
|---|---|---|
| 355,901 | Vauclain | Jan. 11, 1887 |
| 1,340,741 | Schmelzer | May 18, 1920 |
| 1,397,771 | Mort | Nov. 22, 1921 |
| 2,166,692 | Ray | July 18, 1939 |